United States Patent
Sun et al.

(10) Patent No.: US 12,116,102 B2
(45) Date of Patent: Oct. 15, 2024

(54) AIRSHIP AND LONG-TERM FLOATING CAPACITY MAINTENANCE METHOD THEREOF

(71) Applicant: Beihang University, Beijing (CN)

(72) Inventors: Kangwen Sun, Beijing (CN); Xinzhe Ji, Beijing (CN); Haoquan Liang, Beijing (CN); Xiao Guo, Beijing (CN)

(*) Notice: Subject to any disclaimer, the term of this patent is extended or adjusted under 35 U.S.C. 154(b) by 84 days.

(21) Appl. No.: 17/827,950

(22) Filed: May 30, 2022

(65) Prior Publication Data
US 2022/0388624 A1 Dec. 8, 2022

(51) Int. Cl.
| | |
|---|---|
| B64B 1/62 | (2006.01) |
| B60L 8/00 | (2006.01) |
| B60L 58/30 | (2019.01) |
| B64B 1/22 | (2006.01) |
| B64B 1/64 | (2006.01) |
| H01M 8/04082 | (2016.01) |
| H01M 8/0656 | (2016.01) |

(52) U.S. Cl.
CPC ............... B64B 1/62 (2013.01); B60L 8/003 (2013.01); B60L 58/30 (2019.02); B64B 1/22 (2013.01); B64B 1/64 (2013.01); H01M 8/04201 (2013.01); H01M 8/0656 (2013.01); B60L 2200/10 (2013.01); H01M 2250/20 (2013.01); H01M 2250/402 (2013.01)

(58) Field of Classification Search
CPC .... B64B 1/58; B64B 1/62; B64B 1/64; B64D 2041/005
See application file for complete search history.

(56) References Cited

U.S. PATENT DOCUMENTS

| | | | | |
|---|---|---|---|---|
| 5,890,676 | A  * | 4/1999 | Coleman | B64B 1/58 244/30 |
| 9,290,258 | B1 * | 3/2016 | DeVaul | B64B 1/62 |
| 2004/0104304 | A1 * | 6/2004 | Parmley | B64B 1/005 244/30 |
| 2009/0032648 | A1 * | 2/2009 | Pearson | B64U 50/32 244/53 R |
| 2013/0062457 | A1 * | 3/2013 | Deakin | B64B 1/20 343/706 |
| 2014/0252156 | A1 * | 9/2014 | Hiebl | B64C 9/00 244/3 |
| 2015/0246717 | A1 * | 9/2015 | Fournier | B64D 27/24 244/30 |

(Continued)

*Primary Examiner* — Joshua J Michener
*Assistant Examiner* — Colin Zohoori

(57) ABSTRACT

An airship and its long-term floating capacity maintenance method are disclosed. The airship includes an airship capsule and a pod at bottom. A renewable fuel cell and a water tank communicated with each other are arranged in the pod. The water tank is provided with a water inlet connected with a filling aircraft outside the airship. The airship capsule is provided with a solar cell. The interior of the airship capsule is provided with a hydrogen storage bag. The solar cell is electrically connected with the renewable fuel cell. The renewable fuel cell can use electric energy provided by the solar cell to electrolyze water provided by the filling aircraft into hydrogen and supplement the hydrogen to the hydrogen storage bag. The airship can supplement hydrogen to the airship capsule by electrolyzing water to reduce the phenomenon of insufficient gas in the airship capsule.

6 Claims, 2 Drawing Sheets

(56) References Cited

U.S. PATENT DOCUMENTS

2017/0233055 A1\* 8/2017 Brutoco .................. H02S 20/30
                                                                244/30
2018/0109223 A1\* 4/2018 Panas ...................... H02S 40/38
2018/0290720 A1\* 10/2018 Yu ............................. H02J 7/35

\* cited by examiner

AIRSHIP AND LONG-TERM FLOATING CAPACITY MAINTENANCE METHOD THEREOF

CROSS REFERENCE TO RELATED APPLICATION

This patent application claims the benefit and priority of Chinese Patent Application No. 202110637595.1 filed on Jun. 8, 2021, the disclosure of which is incorporated by reference herein in its entirety as part of the present application.

TECHNICAL FIELD

The present disclosure relates to the technical field of flight vehicle, and more specifically, to an airship and its long-term floating capacity maintenance method.

BACKGROUND ART

This part provides only background information related to the present disclosure, which is not necessarily the prior art. Stratospheric airships can stay in the air for a long time at stratospheric height ($\geq 18$ km), and can use solar cells and energy storage batteries to form a circular energy system to realize long-term voyages. In military terms, stratospheric airships can perform intelligence/surveillance/reconnaissance missions. In civil use, stratospheric airships can be used as a communication relay for environmental monitoring, information collection, telecommunications/television services, etc. And they have the advantages of large flight altitude range and wide coverage. Compared with artificial satellite and fixed wing solar aircraft, stratospheric airships have greater load capacity and more abundant conditions for energy balance. To achieve long-term residence and controllable flight, stratospheric airships need to achieve energy balance, buoyancy-gravity balance and thrust-drag balance. The energy balance is mainly required for the energy system. The energy system of stratospheric airship is usually designed to lay solar panels on the upper part of the capsule to form a solar cell array, which converts solar energy to electric energy for flight during the day, and the excess electric energy is stored through the energy storage battery for flight at night, so as to achieve energy balance. Benefiting from the large load capacity of the stratospheric airship, larger energy storage cells and larger solar panels bring greater design margin for the airship to achieve day-night energy balance. The thrust-drag balance means that the propulsion system of stratospheric airship can realize the route or resident flight required by the mission under the limitation of energy balance. The buoyancy-gravity balance is that the airship maintains its height through its own buoyancy.

To achieve the buoyancy-gravity balance of a stratospheric airship without skeleton support, it needs long-term buoyancy holding capacity and shape holding capacity. The capsule needs to maintain the difference of internal and external gas pressure within a certain range, otherwise the shape cannot be maintained, the movement of the airship is no longer controllable, and it is impossible to continue to complete the air stationed mission. The different pressure will cause the filling gas in the capsule to leak outward. Moreover, the body of the capsule is large, and the surface area and the possibility of non-uniformity are also large. It is difficult to maintain the permanent air tightness function when staying in the air for a long time. In the long run, gas leakage is difficult to avoid, which brings challenges to staying in the air for a long time.

SUMMARY

The purpose of the disclosure is to propose an airship aiming at the shortcomings of the prior art. The airship of the disclosure can supplement hydrogen to the airship capsule by electrolyzing water, so as to reduce the phenomenon of insufficient gas in the airship capsule. At the same time, when the water in the airship is insufficient, it can also replenish water in the air through the filling aircraft outside the airship, so as to improve the endurance of the airship and reduce the difficulty of replenishment. The purpose is realized through the following technical scheme.

A first aspect of the disclosure is to provide an airship. The airship includes an airship capsule and a pod at bottom. A renewable fuel cell and a water tank communicated with each other are arranged in the pod. The water tank is provided with a water inlet connected with a filling aircraft outside the airship. The airship capsule is provided with a solar cell. The interior of the airship capsule is provided with a hydrogen storage bag. The solar cell is electrically connected with the renewable fuel cell. The renewable fuel cell can use an electric energy provided by the solar cell to electrolyze a water provided by the filling aircraft into hydrogen and supplement the hydrogen to the hydrogen storage bag.

Preferably, a bidirectional pipe is arranged between the hydrogen storage bag and the renewable fuel cell, the hydrogen in the hydrogen storage bag can return to the renewable fuel cell through the bidirectional pipe.

Preferably, the hydrogen storage bag is provided with a hydrogen supply valve and a hydrogen discharge valve, the hydrogen supply valve is connected with the renewable fuel cell, and the hydrogen discharge valve is connected with the airship capsule.

Preferably, the airship capsule is further provided with an oxygen storage bag connected with the renewable fuel cell, and the oxygen generated by the renewable fuel cell electrolyzing the water is supplemented to the oxygen storage bag.

Preferably, a bidirectional pipe is arranged between the oxygen storage bag and the renewable fuel cell, and the oxygen in the oxygen storage bag can return to the renewable fuel cell through the bidirectional pipe.

Preferably, the oxygen storage bag is provided with an oxygen supply valve and an oxygen discharge valve, the oxygen supply valve is connected with the renewable fuel cell, and the oxygen discharge valve is connected with an external atmosphere.

Preferably, the airship further includes a converter arranged in the pod, and the solar cell is electrically connected with the renewable fuel cell through the converter.

Preferably, the airship further includes an electric device arranged in the pod. The solar cell is electrically connected with the electric device through the converter, and/or the renewable fuel cell is electrically connected with the electric device.

A second aspect of the disclosure is to provide an airship long-term floating capacity maintenance method. The airship long-term floating capacity maintenance method is implemented by the airship according to the first aspect of the disclosure, and the airship long-term floating capacity maintenance method includes the following steps. The airship is controlled to electrically connect the solar cell with the renewable fuel cell of the airship when there is sunlight.

The water in the water tank of the airship is controlled to flow into the renewable fuel cell. The renewable fuel cell electrolyzes water to generate oxygen and hydrogen using solar energy, and the oxygen and the hydrogen are passed into the oxygen storage bag and the hydrogen storage bag respectively. The airship is controlled to connect the renewable fuel cell with the electric device of the airship in the absence of sunlight. The renewable fuel cell uses the oxygen in the oxygen storage bag and the hydrogen in the hydrogen storage bag to react to generate electricity and supplies power for the electric device.

Preferably, the airship long-term floating capacity maintenance method further includes the following steps. A real-time pressure difference in the airship capsule of the airship is obtained. The hydrogen storage bag is controlled to pass hydrogen into the airship capsule according to a fact that the real-time pressure difference is less than a preset pressure difference until the real-time pressure difference is not less than the preset pressure difference.

It can be understood by those skilled in the art that the disclosure proposes an air supply mode suitable for solar airship. The renewable fuel cell uses the water supplemented by the filling aircraft to generate hydrogen to supplement the gas of the airship capsule, so as to realize the ultra-long endurance parking of the airship based on energy balance. Specifically, the airship needs to maintain the pressure difference of the airship capsule for a long time to achieve stable and controllable residence. Supplementing the filling gas in the capsule in the air is of great significance to increase the residence time. However, the direct gas supplement technology is difficult, the implementation is complex, and the requirements for air tightness are high. The airship proposed by this disclosure adopts a renewable fuel cell to supplement hydrogen in the air. Further, water can be replenished through more mature air refueling similar technology. Compared with direct air replenishment technology, it has a more mature reference scheme and is less difficult to realize.

The purpose of the disclosure is to adopt the renewable fuel cell, use the solar cell to convert solar energy into electric energy, and then change it into chemical energy of hydrogen, generate hydrogen and supplement it to the airship capsule, supplement the filling gas in the capsule of the airship and maintain the pressure difference. Further, liquid materials can be supplemented for the renewable fuel cell through unmanned filling aircraft combined with air refueling technology or composite aircraft air recovery technology, so as to solve the problem of filling gas in the capsule leakage of airship during long-term floating and increase the long-term floating capacity of airship.

The airship long-term floating capacity maintenance method provided in the disclosure can further prolong the floating capacity of the airship after realizing the energy balance, buoyancy-gravity balance and thrust-drag balance. Hydrogen generated by the renewable fuel cell is used as filling gas in the capsule. Combined with the energy system and gas replenishment demand, it is not necessary to directly use external gas sources for gas replenishment, so as to reduce the requirements for interfaces. The water tank carried by the filling aircraft replenishes water for the renewable fuel cell, so as to supplement the consumed materials, and further increase the long-term floating capacity of the airship.

BRIEF DESCRIPTION OF THE DRAWINGS

By reading the detailed description of the preferred embodiments below, various other advantages and benefits will become clear to those skilled in the art. The drawings are only for the purpose of showing the preferred embodiments and are not considered to be a limitation of the present disclosure. Moreover, throughout the drawings, the same components are represented by the same reference symbols. In the attached drawings.

Figure 1:
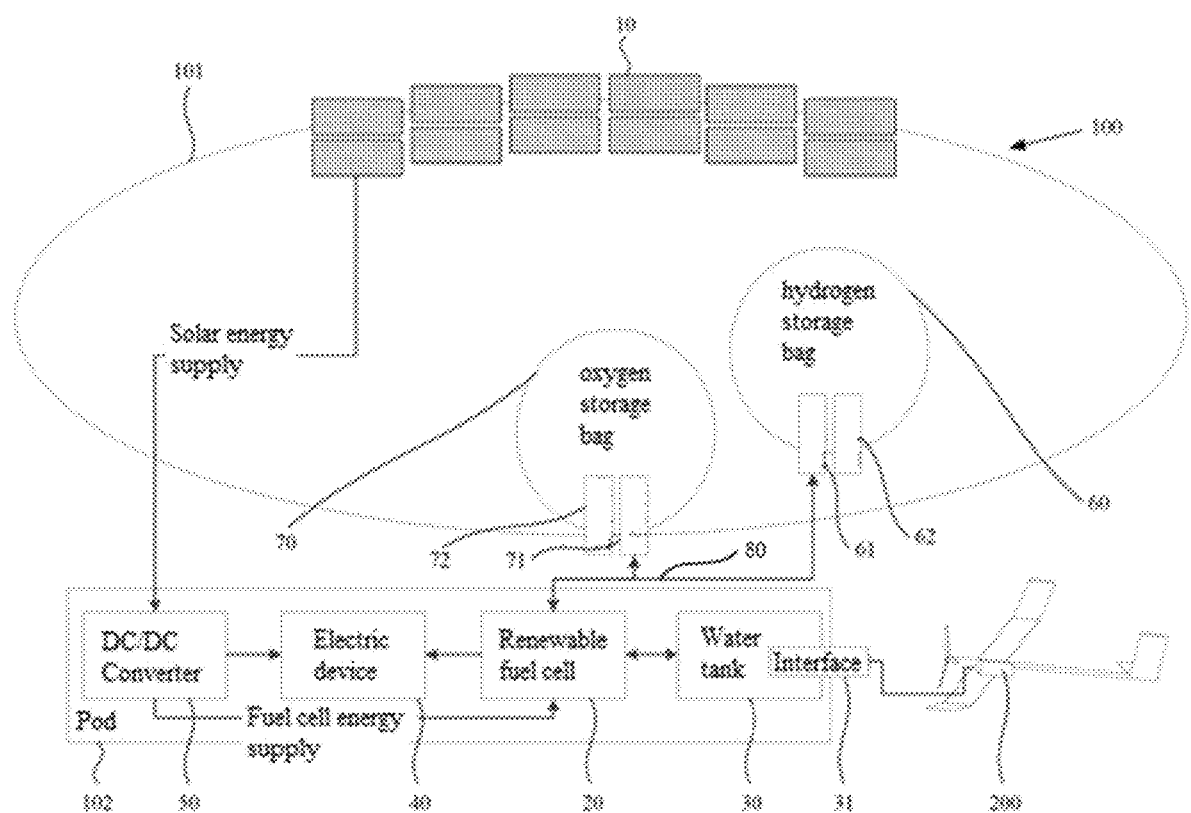
FIG. 1 is a structural diagram of an airship according to an embodiment of the present disclosure.

The numbers in the figures are described as follows.
100. Airship; 101. Airship capsule; 102. Pod;
10. Solar cell; 20. Renewable fuel cell; 30. Water tank; 31. Interface; 40. Electric device; 50. DC/DC converter; 60. Hydrogen storage bag; 61. Hydrogen supply valve; 62. Hydrogen discharge valve; 70. Oxygen storage bag; 71. Oxygen supply valve; 72. Oxygen discharge valve;
200. Filling aircraft.

DETAILED DESCRIPTION OF THE EMBODIMENTS

Exemplary embodiments of the present disclosure will be described in more detail below with reference to the accompanying drawings. Although exemplary embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art. It should be noted that the technical scheme of the disclosure described by the airship is only a preferred embodiment and is not a limitation on the technical scheme of the disclosure. For example, the technical scheme of the disclosure can also be applied to other similar aircraft, and this adjustment does not deviate from the protection scope of the technical scheme of the disclosure.

It should be understood that the terms used herein are for the purpose of describing specific exemplary embodiments only and are not intended to be limiting. Unless the context expressly indicates otherwise, the singular forms "a", "one" and "the" as used herein may also mean including the plural. The terms "comprise", "include" and "have" are inclusive and therefore indicate the existence of the stated features, elements and/or components, but do not exclude the existence or addition of one or more other features, elements, components, and/or combinations thereof.

Although the terms first, second, third, fourth, fifth, and sixth may be used herein to describe multiple elements, components, regions, layers, and/or segments, these elements, components, regions, layers, and/or segments should not be limited by these terms. These terms can only be used to distinguish one element, component, region, layer or segment from another region, layer or segment. Terms such as "first", "second" and other numerical terms do not imply order or sequence when used in the text unless explicitly pointed out by the context. In addition, in the description of the disclosure, unless otherwise clearly specified and limited, the terms "arrange" and "connect" should be understood in a broad sense. For example, it can be fixed connection, detachable connection or integrated connection, and it can be connected directly or indirectly through an intermediate medium. For those skilled in the art, the specific meaning of the above terms in the disclosure can be understood according to the specific situation.

For ease of description, spatial relative relationship terms can be used to describe the relationship of one element or feature relative to another element or feature as shown in the figures. These spatial relative relationship terms are, for example, "bottom", "top", "side", "up", "down", "inside", "outside", etc. These spatial relative relation terms mean to include different orientations of the device in use or operation other than those depicted in the figures. For example, if the device in the figure is flipped, the element described as "under other elements or features" or "at bottom of other elements or features" will then be oriented as "above other elements or features" or "at top of other elements or features". Therefore, the example term "under" can include up and down orientations. The device can be additionally oriented (rotated 90 degrees or in other directions) and the spatial relative relationship terms used herein is interpreted accordingly.

As shown in FIG. 1, a first aspect of the disclosure is to provide an airship 100. The airship 100 includes an airship capsule 101 and a pod 102 at bottom. A renewable fuel cell 20 and a water tank 30 connected with each other are arranged in the pod 102. The water tank 30 is provided with a water inlet connected with a filling aircraft 200 outside the airship 100. The airship capsule 101 is provided with a solar cell 10. A hydrogen storage bag 60 is provided in the interior of the airship capsule 101. The solar cell 10 is electrically connected with the renewable fuel cell 20. The renewable fuel cell 20 uses electric energy provided by the solar cell 10 to electrolyze water provided by the filling aircraft 200 into hydrogen and supplement the hydrogen to the hydrogen storage bag 60.

According to one embodiment of the disclosure, a bidirectional pipe 80 is arranged between the hydrogen storage bag 60 and the renewable fuel cell 20, and the hydrogen in the hydrogen storage bag 60 can return to the renewable fuel cell 20 through the bidirectional pipe 80. Specifically, an array of solar cells 10 composed of solar cells 10 and corresponding power supply cables are arranged above the airship capsule 101, a pod 102 is arranged below the airship capsule 101, and the interior of the airship capsule 101 is provided with the positions of oxygen storage bag 70 and hydrogen storage bag 60.

In this embodiment, during the day, the hydrogen generated by the renewable fuel cell 20 using solar electrolytic water is introduced into the hydrogen gas storage bag 60 through the hydrogen supply pipe in the bidirectional pipe 80. At night, the hydrogen in the hydrogen gas storage bag 60 is introduced into the renewable fuel cell 20 through the hydrogen return pipe in the bidirectional pipe 80. The renewable fuel cell 20 uses the chemical reaction between hydrogen and oxygen in the renewable fuel cell 20 to generate electricity and supply power to the electrical device 40 of the airship 100.

According to one embodiment of the disclosure, the hydrogen storage bag 60 is provided with a hydrogen supply valve 61 and a hydrogen discharge valve 62, the hydrogen supply valve 61 is connected with the renewable fuel cell 20, and the hydrogen discharge valve 62 is connected with the airship capsule 101.

In this embodiment, when hydrogen is exchanged between the renewable fuel cell 20 and the hydrogen storage bag 60, the hydrogen supply valve 61 is opened. When there is no need to exchange hydrogen between the renewable fuel cell 20 and the hydrogen storage bag 60, the hydrogen supply valve 61 is disconnected. When the pressure difference in the airship capsule 101 is insufficient and it is necessary to supplement hydrogen into the airship capsule 101, the hydrogen discharge valve 62 on the hydrogen storage bag 60 is opened, and the hydrogen storage bag 60 supplements hydrogen into the airship capsule 101 through the hydrogen discharge valve 62.

According to one embodiment of the disclosure, the airship capsule 101 is further provided with an oxygen storage bag 70 connected with the renewable fuel cell 20, and oxygen generated by the renewable fuel cell 20 electrolyzing the water is supplemented to the oxygen storage bag 70.

In this embodiment, oxygen is also generated in the process of generating hydrogen by renewable fuel cell 20 electrolyzing water using solar, and the oxygen generated by electrolyzing water is passed into oxygen storage bag 70 for storage and standby.

According to one embodiment of the disclosure, a bidirectional pipe 80 is arranged between the oxygen storage bag 70 and the renewable fuel cell 20, and the oxygen in the oxygen storage bag 70 can return to the renewable fuel cell 20 through the bidirectional pipe 80.

In this embodiment, during the day, the oxygen generated by the renewable fuel cell 20 using solar electrolytic water is introduced into the oxygen storage bag 70 through the oxygen supply pipe in the bidirectional pipe 80. At night, the oxygen in the oxygen storage bag 70 is introduced into the renewable fuel cell 20 through the oxygen return pipe in the bidirectional pipe 80. The renewable fuel cell 20 uses the chemical reaction between oxygen and hydrogen in the renewable fuel cell 20 to generate electricity and supply power to the electric device 40.

According to one embodiment of the disclosure, the oxygen storage bag 70 is provided with an oxygen supply valve 71 and an oxygen discharge valve 72, the oxygen supply valve 71 is connected with the renewable fuel cell 20, and the oxygen discharge valve 72 is connected with an external atmosphere.

In this embodiment, when oxygen is exchanged between the renewable fuel cell 20 and the oxygen storage bag 70, the oxygen supply valve 71 is opened. When there is no need to exchange oxygen between the renewable fuel cell 20 and the oxygen storage bag 70, the oxygen supply valve 71 is disconnected. When the air pressure of the oxygen storage bag 70 is too high and exceeds the pressure limit, the oxygen discharge valve 72 on the oxygen storage bag 70 opens, and the oxygen storage bag 70 discharges oxygen to the outside atmosphere through the oxygen discharge valve 72. Specifically, the oxygen discharge valve 72 passes through the airship capsule 101 so that the oxygen storage bag 70 can be connected with the external atmosphere.

According to one embodiment of the disclosure, the airship 100 further includes a converter 50 arranged in the pod 102, and the solar cell 10 is electrically connected with the renewable fuel cell 20 through the converter 50. Further, the airship 100 includes an electric device 40 arranged in the pod 102. The solar cell 10 is electrically connected with the electric device 40 through the converter 50, and/or the renewable fuel cell 20 is electrically connected with the electric device 40.

In this embodiment, the solar cell 10 provides energy for the electric device 40 of the airship 100 and the electrolysis function of the renewable fuel cell 20 during the day. The converter 50 is preferably a DC/DC converter 50. The solar cell 10 converts solar energy into electric energy. Through the DC/DC converter 50, the operating point of the solar cell 10 is set at the maximum power point, and the electric energy is converted into an appropriate voltage to supply power for the electric device 40 and the electrolysis function of the renewable fuel cell 20.

Specifically, the DC/DC converter 50 has the functions of maximum power point tracking, voltage stabilizing control and current limiting. During the day, the DC/DC converter 50 adjusts the load of the electric device 40 to make the solar cell 10 work at the maximum power point, supplies power to the electric device 40 through the voltage stabilizing control function, and charges the renewable fuel cell 20 through the current limiting function.

The disclosure proposes an air supply mode suitable for solar airship 100. The renewable fuel cell 20 uses the water supplemented by the filling aircraft 200 to generate hydrogen to supplement the gas of the airship capsule 101, so as to realize the ultra-long endurance parking of the airship 100 on the basis of energy balance. Specifically, the airship 100 needs to maintain the pressure difference of the airship capsule 101 for a long time to achieve stable and controllable residence. Supplementing the filling gas in the capsule in the air is of great significance to increase the residence time. However, the direct gas supplement technology is difficult, the implementation is complex, and the requirements for air tightness are high. The airship 100 proposed by the disclosure adopts a renewable fuel cell 20 to supplement hydrogen in the air. Further, water can be replenished through more mature air refueling similar technology. Compared with direct air replenishment technology, it has a more mature reference scheme and is less difficult to realize.

The purpose of the disclosure is to adopt the renewable fuel cell 20, use solar cell 10 to convert solar energy into electric energy, and then change it into chemical energy of hydrogen, generate hydrogen and supplement it to the airship capsule 101, supplement the filling gas in the capsule of the airship 100 and maintain the pressure difference. Further, liquid materials can be supplemented for the renewable fuel cell 20 through unmanned filling aircraft 200 combined with air refueling technology or air recovery technology of composite aircraft, so as to solve the problem of filling gas in the capsule leakage of airship 100 during long-term floating and increase the long-term floating capacity of airship 100.

The airship long-term floating capacity maintenance method provided in the disclosure can further prolong the floating capacity of the airship 100 after realizing the energy balance, buoyancy-gravity balance and thrust-drag balance. Hydrogen generated by the renewable fuel cell is used as filling gas in the capsule. Combined with the energy system and gas replenishment demand, it is not necessary to directly use external gas sources for gas replenishment, so as to reduce the requirements for interfaces 31. The water tank 30 carried by the filling aircraft replenishes water for the renewable fuel cell 20, so as to supplement the consumed materials, and further increase the long-term floating capacity of the airship 100.

Figure 2:
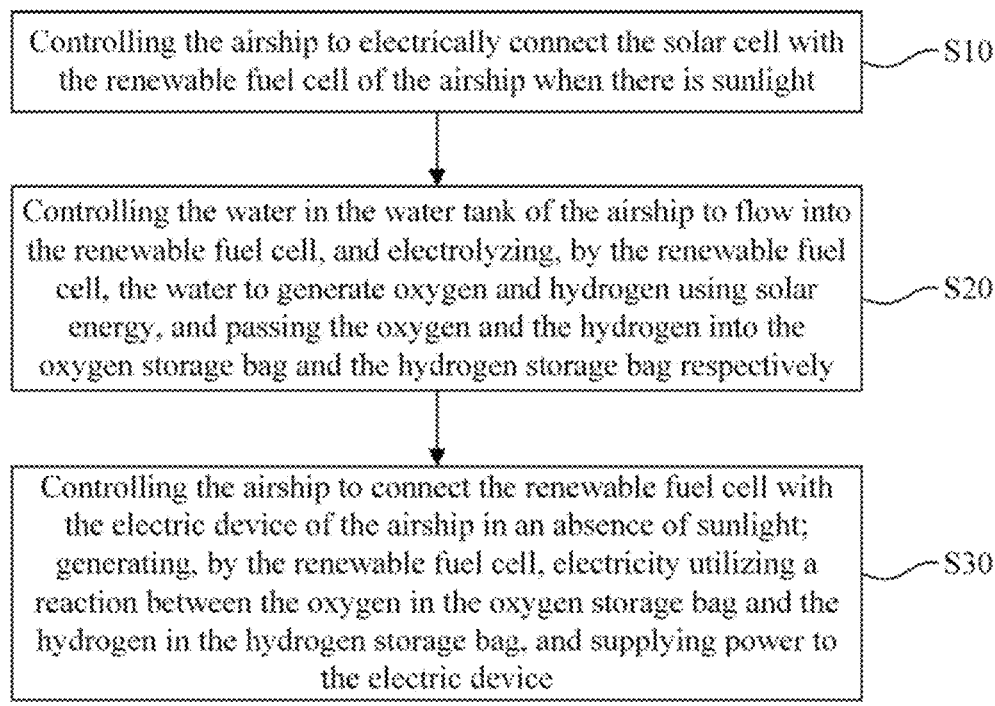
FIG. 2 is a flowchart of an airship long-term floating capacity maintenance method according to an embodiment of the present disclosure.

As shown in FIG. 1 and FIG. 2, a second aspect of the disclosure is to provide an airship long-term floating capacity maintenance method. The airship long-term floating capacity maintenance method is implemented by the airship according to the first aspect of the disclosure, and the airship long-term floating capacity maintenance method includes the following steps. S10: the airship 100 is controlled to electrically connect the solar cell 100 with the renewable fuel cell 20 of the airship 100 when there is sunlight. S20: the water in the water tank 30 of the airship 100 is controlled to flow into the renewable fuel cell 20, the renewable fuel cell 20 electrolyzes the water to generate oxygen and hydrogen using solar energy, and the oxygen and the hydrogen are passed into the oxygen storage bag 70 and the hydrogen storage bag 60 respectively. S30: the airship 100 is controlled to connect the renewable fuel cell 20 with the electric device 40 of the airship 100 in the absence of sunlight, and the renewable fuel cell 20 uses the oxygen in the oxygen storage bag 70 and the hydrogen in the hydrogen storage bag 60 to react to generate electricity and supplies power to the electric device 40.

It should be noted that the sequence between the above steps is only the preferred embodiment of the application, and is not a limitation on the airship long-term floating capacity maintenance method of the application. If there is no contradiction, the sequence between the above steps can be adjusted appropriately, which will not be described in detail here.

Further, according to one embodiment of the disclosure, the airship long-term floating capacity maintenance method further includes the following steps. A real-time pressure difference in the airship capsule 101 of the airship 100 is obtained. The hydrogen storage bag 60 is controlled to pass hydrogen into the airship capsule 101 according to a fact that the real-time pressure difference is less than a preset pressure difference until the real-time pressure difference is not less than the preset pressure difference. The preset pressure difference depends on the performance of airship 100, and the specific value will not be described here.

The specific implementation of the airship long-term floating capacity maintenance method is described in detail below. The airship long-term floating capacity maintenance method of the application is applicable to the air supply of stratospheric airship 100. The following is a detailed description of three states: day, night and supply.

During the day, the solar cell 10 converts the solar energy into electric energy. The solar cell 10 converts solar energy into electric energy. Through the DC/DC converter 50, the operating point of the solar cell 10 is set at the maximum power point, and the electric energy is converted into an appropriate voltage to supply power for the electric device 40 and the electrolysis function of the renewable fuel cell 20. The water in the water tank 30 is electrolyzed into hydrogen and oxygen, which are stored in the hydrogen storage bag 60 and the oxygen storage bag 70 through the hydrogen supply valve 61 and the oxygen supply valve 71 respectively. The pressures of hydrogen storage bag 60 and oxygen storage bag 70 also increase accordingly.

At night, when there is no solar radiation, the hydrogen supply valve 61 and the oxygen supply valve 71 provide fuel for the renewable fuel cell 20 from the hydrogen storage bag 60 and the oxygen storage bag 70, respectively. Hydrogen and oxygen react in the renewable fuel cell 20 to generate water and the water is stored in the water tank 30. At the same time, electric energy is generated to supply power to the electric device 40.

During long-term flight, when the pressure difference of airship capsule 101 is detected to be in a low state (usually when the temperature is low at night), the hydrogen storage bag 60 stores more hydrogen during the day of the next day. At this time, the hydrogen storage bag 60 discharges hydrogen into the airship capsule 101 through the hydrogen discharge valve 62 to increase the pressure difference of the airship capsule 101. After that, the total hydrogen content in the water tank 30 and the hydrogen storage bag 60 will decrease. The filling aircraft 200 can add water to the water tank 30 through the water replenishment interface 31 to maintain the overall hydrogen content. After several times of water filling and gas replenishment, the total oxygen content in the water tank 30 and the oxygen storage bag 70 has been rising, and the pressure difference of the oxygen storage bag 70 will be in a high state. The oxygen can be discharged into the external atmosphere through the oxygen discharge valve 72 to realize the pressure relief of the oxygen storage bag 70.

The above is only the preferred specific embodiments of the disclosure, but the protection scope of the disclosure is not limited to this. Any change or replacement that can be easily thought of by any person skilled in the art within the technical scope disclosed by the disclosure shall be covered by the protection scope of the disclosure. Therefore, the protection scope of the disclosure shall be subject to the protection scope of the claims.

What is claimed is:

1. An airship, comprising an airship capsule and a pod at a bottom of the airship capsule, wherein a renewable fuel cell and a water tank communicating with each other are arranged in the pod, the water tank is provided with a water inlet connected with a filling aircraft outside the airship, the airship capsule is provided with a solar cell, an interior of the airship capsule is provided with positions for an oxygen storage bag and a hydrogen storage bag, the interior of the airship capsule is provided with the hydrogen storage bag, the hydrogen storage bag is provided with a hydrogen supply valve and a hydrogen discharge valve, the hydrogen supply valve is connected with the renewable fuel cell, and the hydrogen discharge valve is connected with the airship capsule, and the solar cell is electrically connected with the renewable fuel cell, and the renewable fuel cell can use electric energy provided by the solar cell to electrolyze water provided by the filling aircraft into hydrogen and supplement the hydrogen to the hydrogen storage bag;

the interior of the airship capsule is further provided with an oxygen storage bag connected with the renewable fuel cell, and an oxygen generated by the renewable fuel cell electrolyzing the water is supplemented to the oxygen storage bag: the oxygen storage bag is provided with an oxygen supply valve and an oxygen discharge valve, the oxygen supply valve is connected with the renewable fuel cell, and the oxygen discharge valve is connected with an external atmosphere.

2. The airship of claim 1, wherein a bidirectional pipe is arranged between the hydrogen storage bag and the renewable fuel cell, and the hydrogen in the hydrogen storage bag can return to the renewable fuel cell through the bidirectional pipe.

3. The airship of claim 1, wherein a bidirectional pipe is arranged between the oxygen storage bag and the renewable fuel cell, and the oxygen in the oxygen storage bag can return to the renewable fuel cell through the bidirectional pipe.

4. The airship of claim 1, wherein the airship further comprises a converter arranged in the pod, and the solar cell is electrically connected with the renewable fuel cell through the converter.

5. The airship of claim 4, wherein the airship further comprises an electric device arranged in the pod, the solar cell is electrically connected with the electric device through the converter, and the renewable fuel cell is electrically connected with the electric device.

6. An airship long-term floating capacity maintenance method, comprising:

controlling the airship to electrically connect a solar cell with a renewable fuel cell of the airship when there is sunlight, controlling water in a water tank of the airship to flow into the renewable fuel cell, and electrolyzing, by the renewable fuel cell, the water to generate oxygen and hydrogen using solar energy, and passing the oxygen and the hydrogen into an oxygen storage bag and a hydrogen storage bag disposed in a airship capsule of the airship respectively;

controlling the airship to connect the renewable fuel cell with a electric device of the airship in an absence of sunlight; generating, by the renewable fuel cell, electricity utilizing a reaction between the oxygen in the oxygen storage bag and the hydrogen in the hydrogen storage bag, and supplying power to the electric device;

obtaining a real-time pressure difference in the airship capsule of the airship during a long-term flight: controlling the hydrogen storage bag to pass hydrogen into the airship capsule according to a fact that the real-time pressure difference is less than a preset pressure difference until the real-time pressure difference is not less than the preset pressure difference;

opening an oxygen discharge valve on the oxygen storage bag when air pressure of the oxygen storage bag exceeding a pressure limit, discharging oxygen to the external atmosphere through the oxygen discharge valve from the oxygen storage bag.

\* \* \* \* \*